(12) United States Patent
Bahr et al.

(10) Patent No.: US 8,780,920 B2
(45) Date of Patent: Jul. 15, 2014

(54) METHOD FOR ESTABLISHING BIDIRECTIONAL DATA TRANSMISSION PATHS IN A WIRELESS MESHED COMMUNICATION NETWORK

(75) Inventors: Michael Bahr, München (DE); Andrea Buttu, Geneva (CH)

(73) Assignee: Siemens Aktiengesellschaft, Munich (DE)

( * ) Notice: Subject to any disclaimer, the term of this patent is extended or adjusted under 35 U.S.C. 154(b) by 1077 days.

(21) Appl. No.: 12/514,503

(22) PCT Filed: Nov. 12, 2007

(86) PCT No.: PCT/EP2007/062215
§ 371 (c)(1),
(2), (4) Date: Jan. 7, 2010

(87) PCT Pub. No.: WO2008/058933
PCT Pub. Date: May 22, 2008

(65) Prior Publication Data
US 2010/0214960 A1    Aug. 26, 2010

(30) Foreign Application Priority Data

Nov. 13, 2006  (DE) .......................... 10 2006 053 409
Jul. 5, 2007   (DE) .......................... 10 2007 031 341

(51) Int. Cl.
*H04L 12/28* (2006.01)
*H04L 12/56* (2006.01)
*H04W 76/02* (2009.01)
*H04W 76/00* (2009.01)

(52) U.S. Cl.
CPC .............. *H04W 76/02* (2013.01); *H04W 76/00* (2013.01); *H04W 76/022* (2013.01); *H04L 45/26* (2013.01); *H04L 45/48* (2013.01)
USPC ........ 370/395.2; 370/254; 370/255; 370/310; 370/351; 370/395.21

(58) Field of Classification Search
None
See application file for complete search history.

(56) References Cited

U.S. PATENT DOCUMENTS 6,356,633 B1 *  3/2002  Armstrong ............... 379/265.11
7,649,884 B1 *  1/2010  Ahmed et al. ................ 370/390

(Continued)

FOREIGN PATENT DOCUMENTS

CN  101039139 A   9/2007   ............ H04B 7/185
JP  5276177 A   10/1993   ............ H04L 12/02

(Continued)

OTHER PUBLICATIONS

IEEE 802.11-06./0328r0, "Joint SEE-Mesh/Wi-Mesh Proposal to 802.11 TGs", Feb. 27, 2006.*

(Continued)

*Primary Examiner* — Ayaz Sheikh
*Assistant Examiner* — Peter Chau
(74) *Attorney, Agent, or Firm* — King & Spalding L.L.P.

(57) ABSTRACT

In a method for establishing a bidirectional data transmission path in a wireless meshed packet-switched communication network, a logical topology in the form of at least one routing tree can be proactively established, wherein a root network node of the routing tree sends first unidirectional data transmission paths regarding routing request messages specifying the root network node to the network nodes of the communication network in periodic time intervals. A first flag is provided in the network nodes of the routing tree that can be put into two different states. Upon receipt of a routing request message, a network node only sends a second unidirectional data transfer path regarding the routing response message specifying the network node to the root-network node if the first flag is switched into a first selectable state. Thus, a bidirectional data transfer path between the root network node and the network node is established.

16 Claims, 4 Drawing Sheets

(56) References Cited

U.S. PATENT DOCUMENTS

| | | | |
|---|---|---|---|
| 7,781,936 B2 | 8/2010 | Nishimura et al. | 310/313 R |
| 2002/0082748 A1* | 6/2002 | Enga et al. | 700/291 |
| 2004/0143842 A1* | 7/2004 | Joshi | 725/32 |
| 2006/0007882 A1* | 1/2006 | Zeng et al. | 370/328 |
| 2008/0095059 A1* | 4/2008 | Chu | 370/238 |
| 2008/0137580 A1* | 6/2008 | Axelsson et al. | 370/315 |
| 2008/0170550 A1* | 7/2008 | Liu et al. | 370/338 |
| 2009/0135824 A1* | 5/2009 | Liu | 370/392 |
| 2009/0274128 A1* | 11/2009 | Zhang et al. | 370/338 |
| 2010/0074194 A1* | 3/2010 | Liu et al. | 370/329 |
| 2010/0118727 A1* | 5/2010 | Draves et al. | 370/252 |
| 2010/0214960 A1 | 8/2010 | Bahr et al. | 370/255 |

FOREIGN PATENT DOCUMENTS

| | | | | |
|---|---|---|---|---|
| JP | 2004112724 | A | 4/2004 | H04L 12/42 |
| JP | 2005236673 | A | 9/2005 | H04B 7/26 |
| JP | 2008533809 | A | 8/2008 | H04L 12/28 |
| WO | 2006/098723 | A1 | 9/2006 | H04L 12/56 |
| WO | 2008/058933 | A1 | 5/2008 | H04L 12/56 |

OTHER PUBLICATIONS

IEEE 802.11 TGs: "Joint SEE-Mesh/Wi-Mesh Proposal to 7802.11 TGs" [Online] Feb. 27, 2006, Seiten 1-165, XP002469386 Gefunden im Internet: URL:https://mentor.iee.org/org/802.11/file/06/11-06-0328-00-000s-joint-seemesh-wimesh-proposal-to-802-11-tgs.doc>; [gefunden am Feb. 15, 2008]; Others.
Michael Bahr: "Proposal Routing for 1EEE 802.11s WLAN Mesh Nertworks" [Online] Aug. 5, 2006, XP002469387 WICON '06, The 2nd Annual International Wireless Internet Conference, Aug. 2-5, 2006, Boston, MA, USA. Gefunden im Internet: URL: http://portal.acm.org/ft_gateway.cfm?id=1234166&type=pdf> [gehuden am Feb. 16, 2009] Kapital 4 Abschnitt 4.2.1, leteter Abstract: Others.
International Search Report, PCT/EP2007/062215, 2 pages, Mar. 19, 2008.
Chinese Office Action, Application No. 201210047294.4, 16 pages, Nov. 21, 2013.

* cited by examiner

METHOD FOR ESTABLISHING BIDIRECTIONAL DATA TRANSMISSION PATHS IN A WIRELESS MESHED COMMUNICATION NETWORK

CROSS-REFERENCE TO RELATED APPLICATIONS

This application is a United States national phase filing under 35 U.S.C. §371 of International Application No. PCT/EP2007/062215, filed Nov. 12, 2007 which claims priority to German Patent Application No. 10 2006 053 409.3, filed Nov. 13, 2006 and German Patent Application No. 10 2007 031 341.3, filed Jul. 5, 2007. The complete disclosure of the above-identified application is hereby fully incorporated herein by reference.

TECHNICAL FIELD

The invention lies in the technical field of telecommunications engineering and relates to a method for setting up bidirectional data transmission paths in a wireless meshed communication network. The invention further relates to a wireless meshed communication network suitable for performing the method.

BACKGROUND

Since the beginning of the nineteen-nineties, a multiplicity of different standards for wireless WLAN communication networks (WLAN=Wireless Local Area Network) have been published by the Institute of Electrical and Electronics Engineers (IEEE) within the framework of the IEEE 802.11 standard family. Certain characteristics of the communication networks, such as transfer rates, frequency ranges, modulation methods, channel numbers, encryption and the like, have been authoritatively specified in these standards on the basis of rapidly advancing technological development.

In the existing standards the smallest unit of a WLAN communication system is the radio cell, in which access points can exchange data with a plurality of terminal devices. A plurality of radio cells can be interconnected by way of cable connections between the access points.

A most recent development within the IEEE 802.11 standard family, which is designated as IEEE 802.11s and is expected to be published as a currently valid standard in 2009, standardizes wireless communication between the network nodes. In IEEE 802.11s, the network nodes, called mesh points, or in abbreviated form MP (MP=Mesh Point), serve as routers for wireless data transmission, thereby creating a wireless meshed ad hoc radio network (mesh network).

Proactive, reactive or hybrid routing protocols can generally be implemented in communication networks.

In communication networks having a proactive routing protocol, data transmission paths established between source and destination network node are maintained in readiness for data transmission purposes, thereby enabling fast data exchange, but having in particular the disadvantage that resources are reserved which then are possibly not used for a data exchange. In the case of a reactive routing protocol, a data transmission path between source and destination network node is set up only when needed, which, though more advantageous in terms of the use of resources, is associated with a latency time for setting up the data transmission path.

In order to exploit the advantages of proactive and reactive routing protocols, a hybrid routing protocol having the designation HWMP (HWMP=Hybrid Wireless Mesh Protocol) is provided for a wireless communication network based on the IEEE 802.11s standard for the purpose of selecting a data transmission path between source and destination network node. In HWMP, a logical topology in the form of one or more routing trees can be mapped onto the physical topology of the network. In order to build and update a routing tree, a root MP (root network node) uses the broadcast method to send routing request messages at periodic time intervals to the other MPs, which messages are designated as "proactive path requests", or in abbreviated form proactive PREQs (PREQ=Path Request). The MPs receive the PREQs, enter the corresponding path data in their routing tables and in this way set up a unidirectional data transmission path from the MP to the sending root MP. In order to keep the number of routing messages for building a local routing tree to a minimum, a so-called proactive PREP flag for a routing reply message PREP (PREP=Path Reply) can be deleted in the proactive PREQ, which is to say that the MPs receive the proactive PREQs, set up a forward path for data transmission from the MP to the root MP, but do not send any routing reply message (PREP) to the root MP, with the result that no reverse paths are set up for data transmission from the root MP to the MPs.

Since data streams between a root MP and the MPs of a routing tree are often bidirectional, it is possible in HWMP to send a routing reply message (PREP) from the MP to the root MP at the start of a data communication, i.e. before the first data packet is transmitted from an MP to a root MP, in order in this way to set up a unidirectional reverse path from the root MP to the MP sending the PREP.

The unidirectional data transmission paths (forward paths) from the MPs to the root MPs are periodically updated by means of the PREQs periodically transmitted by the root MPs so that the unidirectional forward paths of the routing tree can be adapted to match changed conditions in the mesh network. In particular, MPs newly added to the mesh network can be incorporated into routing trees, or data transmission paths that are no longer operational due, for example, to failure of a data link can be changed.

However, because the reverse paths from the root MPs to the MPs are not updated and so remain as they were set up before the transmitting of a first data packet of a data communication by transmission of the PREP by an MP, the situation can occur where, in the case of unchanged connectivity and changed link metrics, forward and reverse paths between a root MP and an MP are different, with the result that on the forward path the data packets take the more favorable (updated) path and on the reverse path take the less favorable (non-updated) path. If a data link in a data transmission path between a root MP and an MP fails, an alternative forward path between the root MP and the MP is set up as a result of the periodically transmitted PREQs, whereas a data transmission over the non-updated reverse path is no longer possible. In this case recourse is made in HWMP to standard mechanisms based on AODV (AODV=Ad hoc On demand Distance Vector), which is associated with a relatively high latency time until data packets start to be transmitted from the root MP to the MP.

SUMMARY

In contrast, according to various embodiments, a method for setting up bidirectional data transmission paths in a wireless meshed communication network can be provided by means of which the above-cited disadvantages can be avoided.

According to an embodiment, in a method for setting up a bidirectional data transmission path in a wireless meshed packet-switched communication network having a plurality of network nodes, one of which serves as the root network node, the following steps can be performed:

a logical topology in the form of at least one routing tree is set up proactively by the root network node of the routing tree sending routing request messages at periodic time intervals to the network nodes of the communication network, the routing request messages specifying first unidirectional data transmission paths to the root network node, a first flag which can be placed into two different states for controlling the sending of a routing reply message is set up in each case in the network nodes of the routing tree, when the first flag has been placed into a selectable first state, a network node, upon receiving one of the routing request messages, sends a routing reply message to the root network node, the routing reply message specifying a second unidirectional data transmission path to the network node, as a result of which a bidirectional data transmission path is set up between the root network node and the network node, and a network node sends no routing reply message when the first flag has been placed into a second state.

According to a further embodiment, the first flag of a network node can be placed into the first state when the network node, as the first network node of the communication network on the data transmission path to the root network node, receives a data packet for transmission to the root network node. According to a further embodiment, the first flag of a network node can be placed into the second state immediately after the sending of a routing reply message to the root network node. According to a further embodiment, the first flag of a network node can be placed into the second state following expiration of a selectable first time period which is started with the transmitting of a data packet to the root network node, which data packet the network node has received as the first network node of the communication network on the data transmission path to the root network node, the first time period being reset to a start value of the selectable first time period each time such a data packet is transmitted. According to a further embodiment, a network node may send a routing reply message to the root network node when the network node, as the first network node of the communication network on the data transmission path to the root network node, has received a data packet for sending to the root network node and, for a second time period immediately preceding the reception of the data packet, has received no data packet for sending to the root network node as the first network node of the communication network on the data transmission path to the root network node. According to a further embodiment, a network node may send a routing reply message to the root network node when a second flag which is set up in the network node and can be placed into two different states for controlling the transmission of a routing reply message has been placed into a selectable first state. According to a further embodiment, the second flags of the network nodes may be preset by default to the second state during a primary initialization of the communication network. According to a further embodiment, the first flag of a network node can be placed into the first state when the network node sends a routing reply message to the root network node before the first data packet of a data communication to the root network node. the routing reply message can be sent to the root network node immediately following reception of the routing request message. According to a further embodiment, the routing reply message can be sent to the root network node with a time delay following reception of the routing request message. According to a further embodiment, the first flags of the network nodes can be preset by default to the second state during a primary initialization of the communication network. According to a further embodiment, a lifetime parameter of a routing reply message encoding the lifetime of a second unidirectional data transmission path to a network node may be set to a lifetime parameter contained in the received routing request message and encoding the lifetime of a first unidirectional data transmission path to the root network node. According to a further embodiment, the method may be based on the HWMP hybrid routing protocol.

According to another embodiment, a method for setting up bidirectional data transmission paths in a wireless meshed packet-switched communication network having a plurality of network nodes, one of which serves as the root network node, may comprise the following steps:

a logical topology in the form of at least one routing tree is set up proactively by the root network node of the routing tree sending routing request messages at periodic time intervals to the network nodes of the communication network, the routing request messages specifying first unidirectional data transmission paths to the root network node, a first flag which can be placed into two different states for controlling the sending of a routing reply message is set up in each case in the network nodes of the routing tree, when the first flag has been placed into a selectable first state, a network node, upon detecting a change in the first unidirectional data transmission path to the root network node, sends a routing reply message to the root network node, the routing reply message specifying a second unidirectional data transmission path to the network node, as a result of which a bidirectional data transmission path is set up between the root network node and the network node, and a network node sends no routing reply message when the first flag has been placed into a second state.

According to yet another embodiment, in a wireless meshed packet-switched communication network, the network nodes are set up in a suitable manner for performing one of the methods as described above.

According to yet another embodiment, a machine-readable program code for a network node of a communication network as described above, may contain control commands that cause the network node to perform one of the methods as described above.

According to yet another embodiment, in a network node of a communication network as described above, a machine-readable program code as described above can be executed.

According to yet another embodiment, in a storage medium machine-readable program code as described above can be stored.

BRIEF DESCRIPTION OF THE DRAWINGS

The invention will now be explained in more detail with the aid of exemplary embodiments, reference being made to the attached drawings, in which.

DETAILED DESCRIPTION

Figure 1:
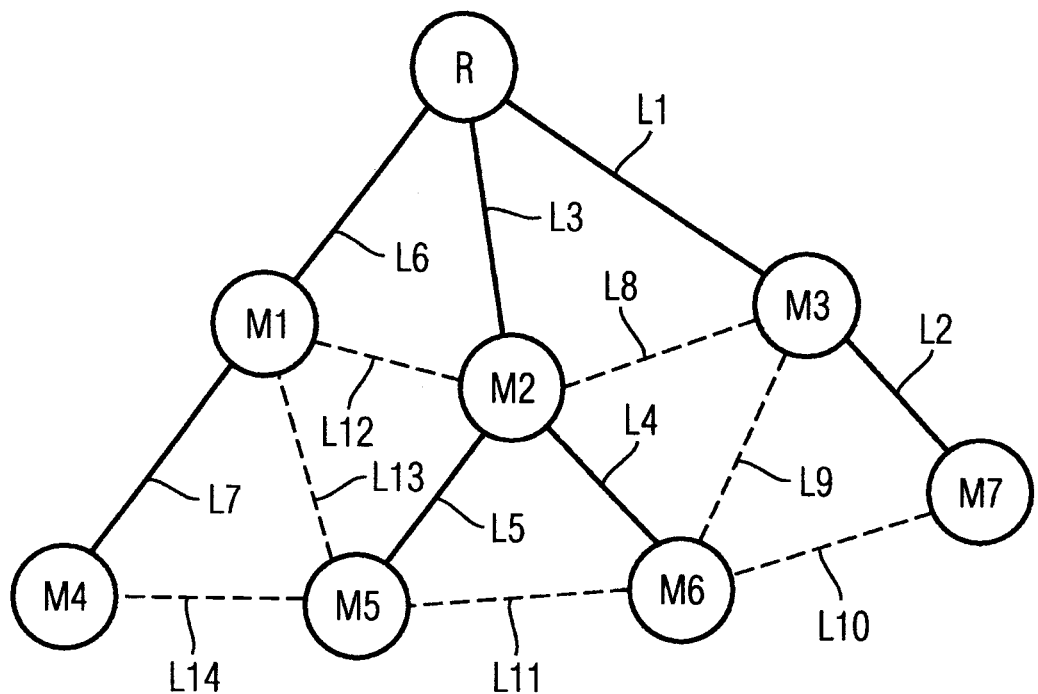
FIG. 1 is a schematic diagram illustrating an exemplary embodiment of the wireless meshed communication network with established routing tree.

According to various embodiments, a method for setting up a bidirectional data transmission path in a wireless meshed packet-switched (ad hoc) communication network is disclosed on whose physical topology a logical topology having at least one tree-like structure ("routing tree") is or has been proactively set up. For that purpose a network node of the communication network serving as the root network node for the routing tree generates and sends routing request messages (abbreviated as RANs) at periodic time intervals to the network nodes of the communication network in order to set first unidirectional data transmission paths to the root network node. To that end, upon reception of the RAN by a network node, an entry can be created or updated in a routing table (forwarding table) of the network node in the network receiving the RAN for the destination network node (root network node), which entry contains the path metric and the next hop (i.e. next network node on the path to the destination network node, which is the network node from which the RAN was received) to the destination network node. In addition, a hop count can also be stored in the routing tables, for example. The method for setting up the routing tree can be based in particular on procedures which are implemented in the HWMP hybrid routing protocol. In particular the routing request messages (RANs) can be proactive path requests (PREQs) in accordance with the HWMP hybrid routing protocol.

A first flag which can be placed into two different states for the purpose of controlling the transmission of a routing reply message is set up in the network nodes of the routing tree. If the first flag of a network node of the routing tree has been placed into a selectable first state, upon receiving a routing request message (RAN) from the root network node, said network node generates a routing reply message (abbreviated as RWN) and sends it via the network nodes contained in the first unidirectional data transmission path to the root network node. If the first flag of a network node of the routing tree has been placed into its second state, said network node generates no RWN upon receiving a RAN from the root network node. By means of the RWN a second unidirectional data transmission path is set from the root network node to the network node generating the RWN. To that end, when the RWN is received by a network node, an entry can be created or updated in a routing table (forwarding table) for the network node which generated the RWN, which entry contains the path metric and the next hop (i.e. next network node on the path to the network node which generated the RWN, which is the network node from which the RWN was received) on the path to the network node which generated the RWN. In addition, a hop count can be stored in the routing tables. In particular the routing reply message (RWN) can be a path reply (PREP) in accordance with the HWMP hybrid routing protocol. The root network node receives the routing reply message (RWN) and establishes the second unidirectional data transmission path from the root network node to the network node which generated the RWN, as a result of which a bidirectional data transmission path is set up between the root network node and said network node which generated the RWN.

Within the communication network, data packets are transmitted from one network node to another network node in the same layer (OSI model). This can be in particular layer 2 or layer 3.

By means of the method according to various embodiments, a bidirectional data transmission path between a root network node and a network node of the routing tree is advantageously set up only when data packets are actually transported on the data transmission path, with the result that the number of routing messages is relatively low. Moreover, in addition to the forward path from the network node to the root network node, the reverse path from the root network node to the network node is also updated, with the result that an updated bidirectional data transmission path between root network node and network node is available for transmission of data packets and a fast response can be made to changes in the data transmission path, whether due to a change in the path metric or due to the failure of a data link.

In its first state the first flag is, for example, "set", that is to say it has been placed into a state "ON" or "1", while in its second state it is "cleared", that is to say it has been placed into a state "OFF" or "0". Equally, it is possible for the first flag to be placed into the state "OFF" in its first state, while it is placed into its state "ON" in its second state.

In an embodiment of the method, the first flag of a network node of the routing tree is placed into the first state if the network node as the first network node ("source network node") of the communication network on the data transmission path to the root network node receives a data packet for transmitting to the root network node ("destination network node"). In this case the network node receives the data packet from a layer (OSI model) which is higher than the layer within which data packets are transmitted inside the communication network. This enables a bidirectional data transmission path to be set up as required from the root network node to the network node in a manner that is particularly simple to implement.

In a further embodiment of the method, the first flag of a network node is placed into its second state immediately after the sending of a routing reply message (RWN) to the root network node, which has the advantage that this approach is aligned with the flow processes of the routing protocol. Furthermore no timer is required.

In a further embodiment of the method, the first flag of a network node is placed into the second state only after a selectable first time period has expired, which time period is started with the transmitting of a data packet to the root network node as the destination network node, for which data packet the network node is a source network node (which data packet the network node received as the first network node of the communication network on the data transmission path to the root network node), the first time period being reset to a start value of the selectable time period each time a data packet of said type, for which the network node is a source network node, with the root network node as the destination network node. This embodiment of the method can be implemented in a particularly simple manner.

In a further embodiment of the method, a network node generates and sends a routing reply message (RWN) to the root network node when the network node, as the source network node, receives a data packet (which the network node received as the first network node of the communication network on the data transmission path to the root network node for sending to the root network node) and for a certain second time period immediately preceding the reception of the data packet has received no data packet as the source network node (in other words, no data packet for sending to the root network node as the first network node of the communication network on the data transmission path to the root network node). This advantageously enables a bidirectional data transmission path to be set up between the root network node and said network node each time a data communication begins.

In particular in the last-mentioned embodiment of the method, a network node can generate a routing reply message (RWN) and send it to the root network node when a second flag which has been set up in the network node and can be placed into two different states has been placed into a selectable second state. This permits a particularly simple implementation of the method.

In its first state the second flag is, for example, "set", i.e. has been placed into a state "ON" or "1", while in its second state it is "cleared", i.e. has been placed into a state "OFF" or "0". Equally, it is possible for the second flag to be placed into the state "OFF" in its first state, while in its second state it is placed into its state "ON".

In a further embodiment of the method, in the event that a data packet is a first data packet of a data communication, which can be recognized for example by the fact that the second flag has been placed into its second state, the first flag of a network node can be placed into the first state when the network node sends a routing reply message (RWN) to the root network node prior to the first data packet (D1) of a data communication. This, however, leads to an additional condition having to be interrogated.

In a further embodiment of the method, the routing reply message (RWN) is sent to the root network node immediately following reception of the routing request message (RAN). In an alternative embodiment of the method hereto, the routing reply message (RWN) is sent to the root network node (R) with a time delay following reception of the routing request message (RAN). The last-cited alternative may be preferred because it has the advantage that the number of routing messages can be reduced, since the probability for the reception of further routing request messages (RANs) with better path metrics is lowered after the sending of the RWN.

In a further embodiment of the method, a lifetime parameter of a routing reply message (RWN) encoding the lifetime of a second unidirectional data transmission path to a network node is set to a lifetime parameter contained in the received routing request message (RAN) and encoding the lifetime of a first unidirectional data transmission path to the root network node (R). In this way it can be achieved in an advantageous manner that the lifetimes of the forward and reverse paths of a bidirectional data transmission path between the root network node and a network node are identical.

According to various embodiments, a method for setting up a bidirectional data transmission path in a wireless meshed packet-switched communication network as described above, can be combined in particular with the above-described method. In said method, when the first flag has been placed into its selectable first state, if a change in the first unidirectional data transmission path to the root network node is detected, a routing reply message (RWN) specifying a second unidirectional data transmission path to the network node is sent to the root network node, as a result of which a bidirectional data transmission path is set up between the root network node and the network node.

According to various further embodiments, a wireless meshed packet-switched (ad hoc) communication network as described above can be set up in such a way that it can perform a method as described above.

According to various further embodiments, on a network node of a wireless meshed packet-switched (ad hoc) communication network as described above, a machine-readable program code as described above can be executed.

According to various embodiments, a storage medium may store a machine-readable program code as described above.

FIG. 1 shows an exemplary embodiment of the wireless meshed packet-switched ad hoc communication network (mesh network). The mesh network comprises a plurality—in this case, by way of example, eight—network nodes (mesh points) R, M1, M2, . . . , M7, which are connected to one another in the form of a mesh via 14 wireless physical point-to-point data links L1, L2, . . . , L14. Thus, for example, the root network node R is wirelessly connected for data communication purposes via a first data link L1 to the third network node M3, via a third data link L3 to the second network node M2, and via a sixth data link L6 to the first network node M1. In addition, the second network node M2, for example, is connected for data communication purposes via an eighth data link L8 to the third network node M3. All further details concerning the data links and the network nodes are to be understood in an analogous manner.

In the mesh network shown in FIG. 1, a proactive routing tree is set up from the root network node R as the root mesh point to all network nodes M1, M2, . . . , M7, the data links belonging to the routing tree, i.e. the first data link L1, the third data link L3, the sixth data link L6, the second data link L2, the fourth data link L4, the fifth data link L5 and the seventh data link L7, being drawn in FIG. 1 with unbroken, bold lines, while the remaining data links not belonging to the routing tree are drawn with dashed, non-bold lines.

The routing tree is set up based on standard mechanisms using distance vectors and link state protocols, as provided in the HWMP routing protocol of the IEEE 802.11s standard. Thus, the root network node R periodically sends routing request messages (RANs) by the broadcast method to all network nodes M1, M2, . . . , M7 of the communication network which specify the data transmission path to the root network node and serve for updating the routing tables of the network nodes M1, M2, . . . , M7. By this means unidirectional data transmission paths are set up in each case for the purpose of transmitting payload data packets from the network nodes M1, M2, . . . , M7 to the root network node R. Thus, for example, a unidirectional data transmission path is proactively set up from the seventh network node M7 via the second data link L2 and the first data link L1, with the third network node M3 being inserted as an intermediate node, to the root network node R. Furthermore, for example, a unidirectional data transmission path is proactively set up from the fifth network node M5 via the fifth data link L5 and the third data link L3, with the second network node M2 being inserted as an intermediate node, to the root network node R. All further proactively established unidirectional data transmission paths from the network nodes M1, M2, . . . , M7 to the root network node R are to be understood in an analogous manner.

An RWN reply flag, which can be set ("1") or cleared ("0"), is set up as the first flag in each case in the network nodes M1, M2, . . . , M7.

In addition, an RWN-sent flag, which can be set ("1") or cleared ("0"), is set up as the second flag in each case in the network nodes M1, M2, . . . , M7.

If the RWN reply flag is set in a network node M1, M2, ..., M7 and said network node receives a periodically broadcast RAN from the root network node R, then said network node sends a reply message (RWN) to the root network node R in order to set up the reverse path for transmitting (payload) data packets from the root network node R to said network node. If the RWN reply flag is set in a network node M1, M2, ..., M7 and said network node detects, e.g. as a result of a fault message identifying a failed data link, that the data transmission path from said network node to the root network node has changed, then in this case too said network node sends a reply message RWN to the root network node R in order to set up the reverse path for transmitting (payload) data packets from the root network node R to said network node. The RWNs are messages of the type provided in the HWMP routing protocol of the IEEE 802.11s standard (PREPs), though there they are transmitted only before the start of a data communication, i.e. before the first data packet is transmitted.

It is critical for the setting or clearing of the RWN reply flag in a network node M1, M2, ..., M7 whether a network node M1, M2, ..., M7 receives data packets from a higher layer above the wireless mesh network layer deployed between the network nodes for the purpose of transmitting data packets within the communication network or whether a network node receives data packets only from another network node.

Figure 2:
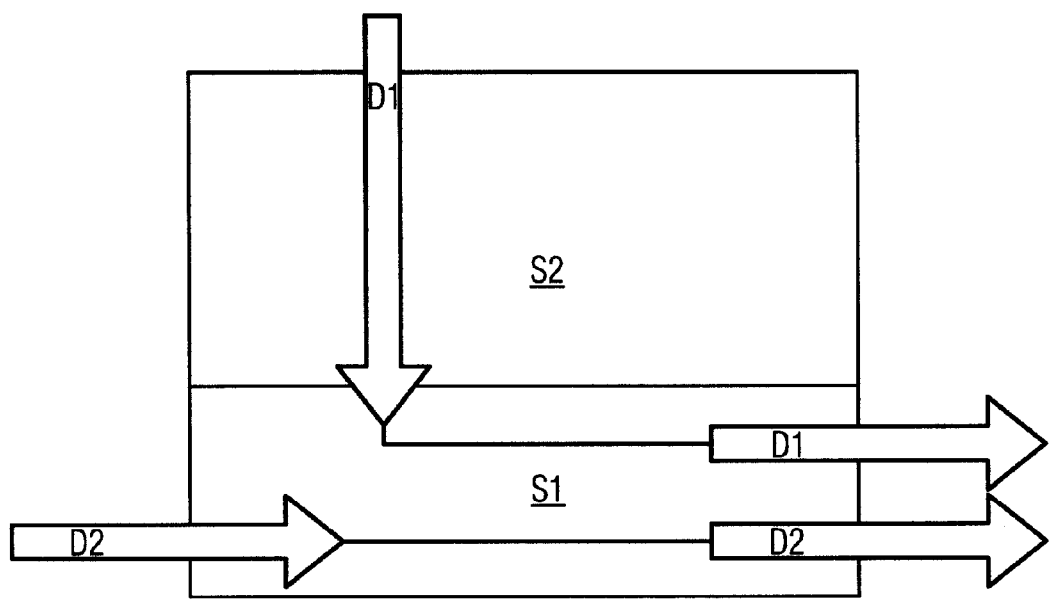
FIG. 2 is a schematic diagram illustrating the forwarding of data packets D1 as source network node and the forwarding of data packets D2 as non-source-network node in the communication network shown in FIG. 1.

This is explained in more detail with reference to FIG. 2. In FIG. 2, the data packets for which a network node is a source network node are identified as data packets "D1", while data packets for which a network node is not a source network node are identified as data packets "D2". The data packets D1 originate from higher layers (OSI model), such as applications, Internet protocol layer or IEEE 802.1D bridging, which are identified overall by S2 in FIG. 2, and, as indicated by the downward-pointing arrow in FIG. 2, are transferred into the wireless mesh layer, which serves for data transmission within the mesh network and is identified by S1 in FIG. 2, and then transmitted between the network nodes. In contrast hereto, data packets D2 are transmitted from one network node to another network node within the wireless mesh layer S1. The same network node can therefore be a source network node for data packets D1 and not a source network node for data packets D2. A destination network node forwards the data packets D2 into one of the higher layers S2 (not shown in more detail in FIG. 2). Only network nodes which receive data packets D1 from the higher layers S2 are source network nodes and set and clear the RWN reply flag. Network nodes which receive no data packets D1 from the higher layers S2 are not source network nodes and do not set or clear the RWN reply flag.

During the initialization of the wireless meshed communication network, all RWN reply flags of the network nodes M1, M2, ..., M7 are cleared (0) (default). Similarly, during the initialization of the wireless meshed communication network, all RWN-sent flags of the network nodes M1, M2, ..., M7 are cleared (0) (default).

The root network node R periodically floods the mesh network with RANs so that each network node, after receiving a RAN, can enter a corresponding data transmission path to the root network node R in its routing table. When a network node receives a RAN, an entry is created or updated in a routing table (forwarding table) of the network node in the network receiving the RAN for the destination network node (root network node), which entry contains the path metric and the next hop to the destination network node, i.e. the next network node on the path to the destination network node. In addition a hop count can be stored in the routing tables. The method for building the routing tree is based on procedures that are implemented in the HWMP hybrid routing protocol, the routing request messages (RANs) being proactive path requests (PREQs) in accordance with the HWMP hybrid routing protocol. This method step is performed by all the network nodes irrespective of whether they are source network nodes or not.

In the following it is assumed by way of example that the fifth network node M5 receives data packets D1 from a higher layer S2 and therefore serves as the source network node.

If the fifth network node M5 receives a periodically transmitted request message RAN from the root network node R, it enters the data transmission path specified by this RAN in its routing table or overwrites the existing entry and thus periodically updates its unidirectional data transmission path to the root network node R.

In the case of a request for data packets D1 to be transmitted to the root network node R, i.e. before the first data packet of a data communication is transmitted, the fifth network node M5 generates and sends a routing reply message RWN to the root network node R. The root network node R receives said RWN and enters the corresponding data transmission path to the fifth network node M5 in its routing table in order thereby to set up a unidirectional data transmission path (reverse path) from the root network node to the fifth network node M5 and hence a bidirectional data transmission path between the root network node R and the fifth network node M5.

All data packets that are sent within a specific time period following the last data packet D1 by the fifth network node M5 are regarded as "further" data packets. If the fifth network node M5 sends no data packet D1 during the said time period, each data packet sent subsequently, after this time period has elapsed, is regarded as a "first" data packet. Different "data communications" are distinguished by means of this predefinable time period.

By means of the state of its RWN-sent flag, the fifth network node M5 can identify whether a data packet D1 is a "first" data packet or a further data packet of the same data communication. The RWN-sent flag is set, which is to say placed into the state ON/1, if either a RWN is sent prior to the first data packet D1 or a RWN is sent in response to a received RAN with the RWN reply flag set. The RWN-sent flag is cleared, which is to say set to OFF/0, with each received RAN which would send off an RWN when the RWN reply flag is set.

By this means it can additionally be ensured that the RWN-sent flag is not inadvertently cleared when a second RAN of the current root announcement is received (same sequence number or identifier), on account of this, however, no RWN is sent to the root network node because the path metric of the second RAN is worse than the path metric of the first RAN. The RWN-sent flag must now not be reset, since otherwise a further RWN would be sent before the next data packet D1.

It is advantageous to clear the RWN-sent flag only when the RWN reply flag has been cleared. As a result no additional RWN is sent when a data packet D1 is to be sent between RAN and associated RWN.

A data packet D1 is regarded as the first data packet when the RWN-sent flag is cleared in the fifth network node M5, whereas a data packet D1 is regarded as a further data packet when the RWN-sent flag is set in the fifth network node M5.

In a first flag-setting variant of the method, if a reply message RWN is sent to the root network node R on account of a first data packet D1, the RWN reply flag of the fifth network node M5 is set.

In a second flag-setting variant of the method that is preferred by comparison with the first flag-setting variant, the RWN reply flag of the fifth network node M5 is not set until a data packet D1 is sent from the fifth network node M5 to the root network node R. The second flag-setting variant is advantageous compared to the first flag-setting variant because it is not necessary to interrogate a further condition, as a result of which the implementation is simplified.

If the fifth network node M5 receives a periodically transmitted routing request message RAN from the root network node R, it enters the data transmission path specified by said RAN in its routing table or overwrites the existing entry and thereby updates its data transmission path to the root network node R. If the RWN reply flag is set, the fifth network node M5 additionally sends a reply message RWN to the root network node R. The root network node R receives the RWN and enters the data transmission path to the fifth network node M5 specified by this RWN in its routing table or overwrites the existing entry in order thereby to set up or update a unidirectional data transmission path (reverse path) from the root network node to the fifth network node M5, and in this way set up a bidirectional data transmission path between the root network node and the fifth network node M5.

The root network node R sends periodic request messages RANs by the broadcast method to the network nodes M1, M2, ..., M7. This means that each network node M1, M2, ..., M7 can also receive the same routing request message more than once, with each routing request message specifying a different data transmission path to the root network node R with a possibly different path metric. By referring to an identifier or sequence number, each network node M1, M2, ..., M7 can distinguish the different routing request messages (RANs) sent periodically by the root network node R.

If the fifth network node M5 receives a routing request message RAN from the root network node R and if the RWN reply flag is set, then according to a first RWN sending variant of the method the fifth network node M5 can immediately send a routing reply message RWN to the root network node R. If the fifth network node M5 receives further routing request messages RANs with the same sequence number or identifier from the root network node R, then for each RAN with a better path metric to the root network node R the fifth network node M5 in turn immediately sends a routing reply message RWN to the root network node R. This means that routing reply messages RWN are continually sent from the fifth network node M5 to the root network node R until no more routing request messages with better path metrics are received.

If the fifth network node M5 receives a periodically transmitted routing request message RAN from the root network node R and if the RWN reply flag is set, then according to a preferred second RWN-sending variant of the method the fifth network node M5 sends a routing reply message RWN to the root network node R only after a selectable waiting time following reception of the RAN. All routing request messages RAN (with the same sequence number or ID) received from the fifth network node M5 during this waiting time are analyzed with regard to the path metrics, the fifth network node M5 sending a routing reply message RWN for the RAN with the most favorable path metric to the root network node R. By this means the probability that further RANs (same sequence number or ID) with better path metrics will be received from the fifth network node M5 after the sending of the routing reply message RWN is lowered, which advantageously means that the number of transmitted routing reply messages RWN can be decreased and the data volume reduced.

Equally it is possible that if the data transmission path from the fifth network node M5 to the root network node R changes for a reason other than due to the reception of a RAN and if the RWN reply flag is set, a routing reply message RWN is likewise generated by the fifth network node M5 and sent to the root network node R. This can be the case, for example, when the fifth network node M5 receives a fault message encoding the failure of a data link in the data transmission path or detects the failure of an adjacent data link via a hardware detector.

There are various resetting variants for clearing the RWN reply flag.

According to a first flag-resetting variant, the RWN reply flag is reset to 0 immediately after the sending of an RWN in response to the reception of an RAN from the fifth network node M5. If the fifth network node M5 sends no data packets D1 within the time interval for the periodic transmitting of RANs by the root network node R, received RANs are no longer answered with an RWN. The RWN reply flag is set again for each data packet D1 sent during this time interval.

According to a second flag-resetting variant, the RWN reply flag is reset to 0 by the fifth network node M5 following the expiration of a selectable time period after the sending of an RWN in response to the reception of an RAN, prior to a first data packet D1 or a change in the data transmission path. In the process a timer for measuring the lapsing of the selectable time period is reset to the start value again each time a data packet D1 is sent from the fifth network node M5 to the root network node R. In this case the start value of the timeout should be greater than the time interval for the periodic transmitting of RANs by the root network node R so that RANs do actually arrive at the fifth network node M5 when a RWN reply flag is set.

Whereas the first flag-resetting variant is aligned to the flow processes of the routing protocol, the second flag-resetting variant is geared to the data traffic. An advantage of the first flag-resetting variant is that no additional timer is required. An advantage of the second flag-resetting variant is that it is very easy to implement.

If the fifth network node M5 sends no data packets D1 within the time interval for the periodic transmitting of RANs by the root network node R, received RANs are no longer answered with an RWN. The RWN reply flag is set again for each data packet D1 sent during this time interval.

The parameters of the RWN which the fifth network node M5 sends to the root network node R are set in accordance with the rules of HWMP or the RM-AODV/AODV on which HWMP is based. The lifetime in the RWN is set to the lifetime contained in the RAN or proactive RREQ.

Figure 3:
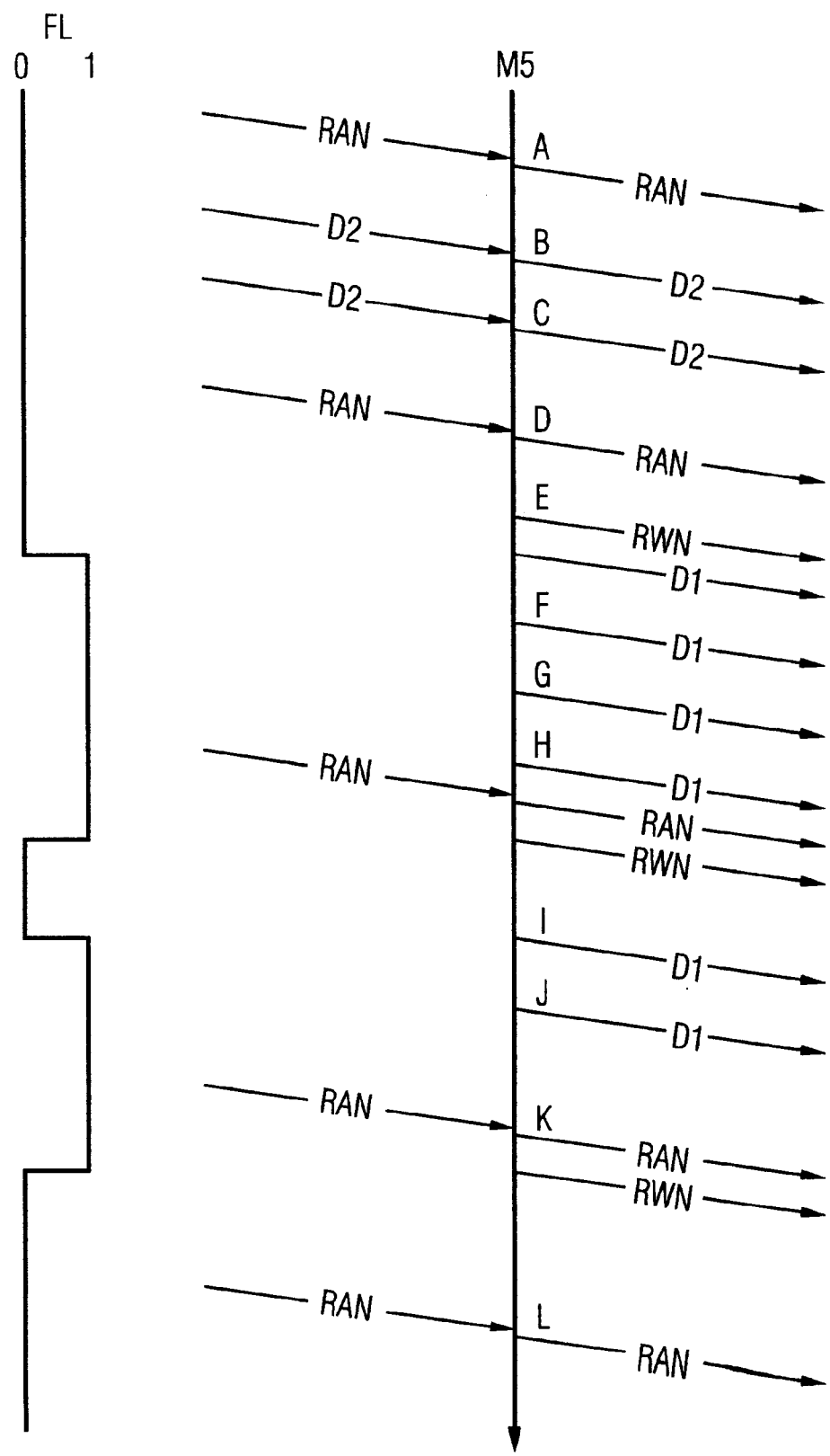
FIG. 3 is a schematic diagram illustrating an exemplary embodiment of the method which is performed on a network node in the communication network shown in FIG. 1.

Reference will now be made to FIG. 3, wherein an exemplary embodiment of the method in the communication network shown in FIG. 1 is explained in a schematic diagram, with the first flag-resetting variant for resetting (clearing) the RWN reply flag being implemented.

In the diagram shown in FIG. 3, the line "FL" represents the state of the RWN reply flag, which can be cleared (0) or set (1). The line M5 represents the fifth network node M5, which serves as the source network node. Arrows striking the line M5 symbolize data packets received by the fifth network node M5. Arrows departing from the line M5 symbolize data packets sent by the fifth network node M5. In FIG. 3, the lines FL and M5 in each case run from top to bottom, thus representing a time characteristic. Different situations arising during the method for setting up bidirectional data transmission paths between the fifth network node M5 and the root network node R are represented by the letters A-L.

The RWN-sent flag of the fifth network node M5 is not shown in FIG. 3. The RWN reply flag and the RWN-sent flag of the fifth network node M5 are cleared by default.

In situation "A", the fifth network node M5 receives a routing request message RAN from the root network node R, transfers the data transmission path specified therein into its routing table or updates the corresponding entry in its routing table in order thereby to set up a unidirectional data transmission path from the fifth network node M5 to the root network node R, updates the RAN and forwards this modified RAN with a short time delay to the next network nodes. The RWN reply flag of the fifth network node M5 continues to remain cleared. The RWN-sent flag of the fifth network node M5 continues to remain cleared.

In situation "B", the fifth network node M5 receives a data packet D2 from a different network node, the second network node M2 for example, and forwards this data packet D2 to a different network node. The RWN reply flag of the fifth network node M5 continues to remain cleared. The RWN-sent flag of the fifth network node M5 continues to remain cleared.

In situation "C", the fifth network node M5 again receives a data packet D2 from a different network node, the second network node M2 for example, and forwards this data packet D2 to a different network node. The RWN reply flag of the fifth network node M5 continues to remain cleared. The RWN-sent flag of the fifth network node M5 continues to remain cleared.

In situation "D", the fifth network node M5 receives a further (recently generated) request message RAN with a sequence number different from the previous RAN from the root network node R, updates the corresponding entry in its routing table in order thereby to set up an updated unidirectional data transmission path from the fifth network node M5 to the root network node R, updates the RAN and forwards this modified RAN with a short time delay to the next network nodes. The RWN reply flag of the fifth network node M5 continues to remain cleared. The RWN-sent flag of the fifth network node M5 continues to remain cleared.

In situation "E", the fifth network node M5 receives a data packet D1 from a higher layer (S2), that is to say a layer above the wireless mesh layer of the mesh network, within which the network nodes exchange data packets which the fifth network node M5 is to transmit to the root network node R. This is not shown in more detail in FIG. 3.

Even before the data packet D1 is transmitted to the root network node R, i.e. before the first data packet D1 is transmitted, the fifth network node M5 generates and sends a reply message RWN to the root network node R. The root network node R receives the RWN and enters the corresponding data transmission path to the fifth network node M5 in its routing table in order thereby to set up a unidirectional data transmission path (reverse path) from the root network node to the fifth network node M5 and in this way set up a bidirectional data transmission path between the fifth network node M5 and the root network node R. At the same time the fifth network node M5 sets its RWN-sent flag. Next, the fifth network node M5 sends the data packet D1 to the root network node R. At the same time the fifth network node M5 sets its RWN reply flag.

In situation "F", the fifth network node M5 receives a further data packet D1 (not shown in more detail in FIG. 3) and sends the data packet D1 to the root network node R. The RWN reply flag of the fifth network node M5 continues to remain set. The RWN-sent flag of the fifth network node M5 continues to remain set.

In situation "G", the fifth network node M5 receives a further data packet D1 (not shown in more detail in FIG. 3) and sends the data packet D1 to the root network node R. The RWN reply flag of the fifth network node M5 continues to remain set. The RWN-sent flag of the fifth network node M5 continues to remain set.

In situation "H", the fifth network node M5 receives a further data packet D1 (not shown in more detail in FIG. 3) and sends the data packet D1 to the root network node R. The RWN reply flag of the fifth network node M5 continues to remain set. The RWN-sent flag of the fifth network node M5 continues to remain set.

Subsequently, in situation "H", the fifth network node M5 receives a further (recently generated) routing request message RAN with a different sequence number from the previous RAN from the root network node R, updates the corresponding entry in its routing table in order thereby to set up an updated unidirectional data transmission path from the fifth network node M5 to the root network node R, updates the RAN and forwards this modified RAN with a short time delay to the next network nodes. In addition, the fifth network node M5 clears its RWN-sent flag or leaves it set, since its RWN reply flag is set.

As the fifth network node M5 has received a periodically transmitted request message RAN from the root network node R and as the RWN reply flag is set, the fifth network node M5 generates a reply message RWN and sends this, with a short time delay for example, to the root network node R. The fifth network node M5 sets its RWN-sent flag. The root network node R receives the RWN and overwrites the corresponding data transmission path to the fifth network node M5 in its routing table in order thereby to update its unidirectional data transmission path (reverse path) from the root network node R to the fifth network node M5.

As a result of the time delay before the RWN is transmitted to the root network node R following reception of the RAN, the probability that still further RANs with better path metrics (and the same sequence number) will be received from the fifth network node M5 after the sending of the routing reply message RWN is lessened in order in this way to reduce the number of RWNs sent to the root network node R.

According to the first flag-resetting variant for the RWN reply flag, the RWN reply flag is cleared with the transmitting of the reply message RWN.

In situation "I", the fifth network node M5 receives a further data packet D1 destined for the root network node R (not shown in more detail in FIG. 3) and sends the data packet D1 to the root network node R. The RWN reply flag of the fifth network node M5 is set. The RWN-sent flag of the fifth network node M5 continues to remain set.

In situation "J", the fifth network node M5 receives a further data packet D1 (not shown in more detail in FIG. 3) and sends the data packet D1 to the root network node R. The RWN reply flag of the fifth network node M5 remains set. The RWN-sent flag of the fifth network node M5 continues to remain set.

In situation "K", the fifth network node M5 receives a further (recently generated) request message RAN with a sequence number changed compared to the previous RAN from the root network node R, updates the corresponding entry in its routing table in order thereby to set up an updated unidirectional data transmission path from the fifth network node M5 to the root network node R, updates the RAN and forwards this modified RAN, with a short time delay for example, to the next network nodes. In addition, the fifth network node M5 clears its RWN-sent flag or leaves it set, since its RWN reply flag is set. As the fifth network node M5 receives a periodically transmitted routing request message RAN from the root network node R and as the RWN reply flag is set, the fifth network node M5 generates a routing reply message RWN and sends the RWN, with a short time delay for example, to the root network node R. The root network node R receives the RWN and overwrites the corresponding data transmission path to the fifth network node M5 in its routing table in order thereby to update its unidirectional data transmission paths (reverse path) from the root network node R to the fifth network node M5. In addition, according to the first flag-resetting variant for the RWN reply flag, the RWN reply flag is cleared with the transmitting of the reply message RWN. The RWN-sent flag is set with the transmitting of the RWN.

In situation "L", the fifth network node M5 receives a further (recently generated) routing request message RAN with a sequence number different from the previous RAN from the root network node R, updates the corresponding entry in its routing table in order thereby to set up an updated unidirectional data transmission path from the fifth network node M5 to the root network node R, updates the RAN and forwards this modified RAN with a short time delay to the next network nodes. The fifth network node M5 in fact receives a periodically transmitted request message RAN from the root network node R, but since the RWN reply flag is cleared, the fifth network node M5 generates no reply message RWN and sends no corresponding RWN to the root network node R. The RWN-sent flag is cleared with the reception of the RAN.

Figure 4:
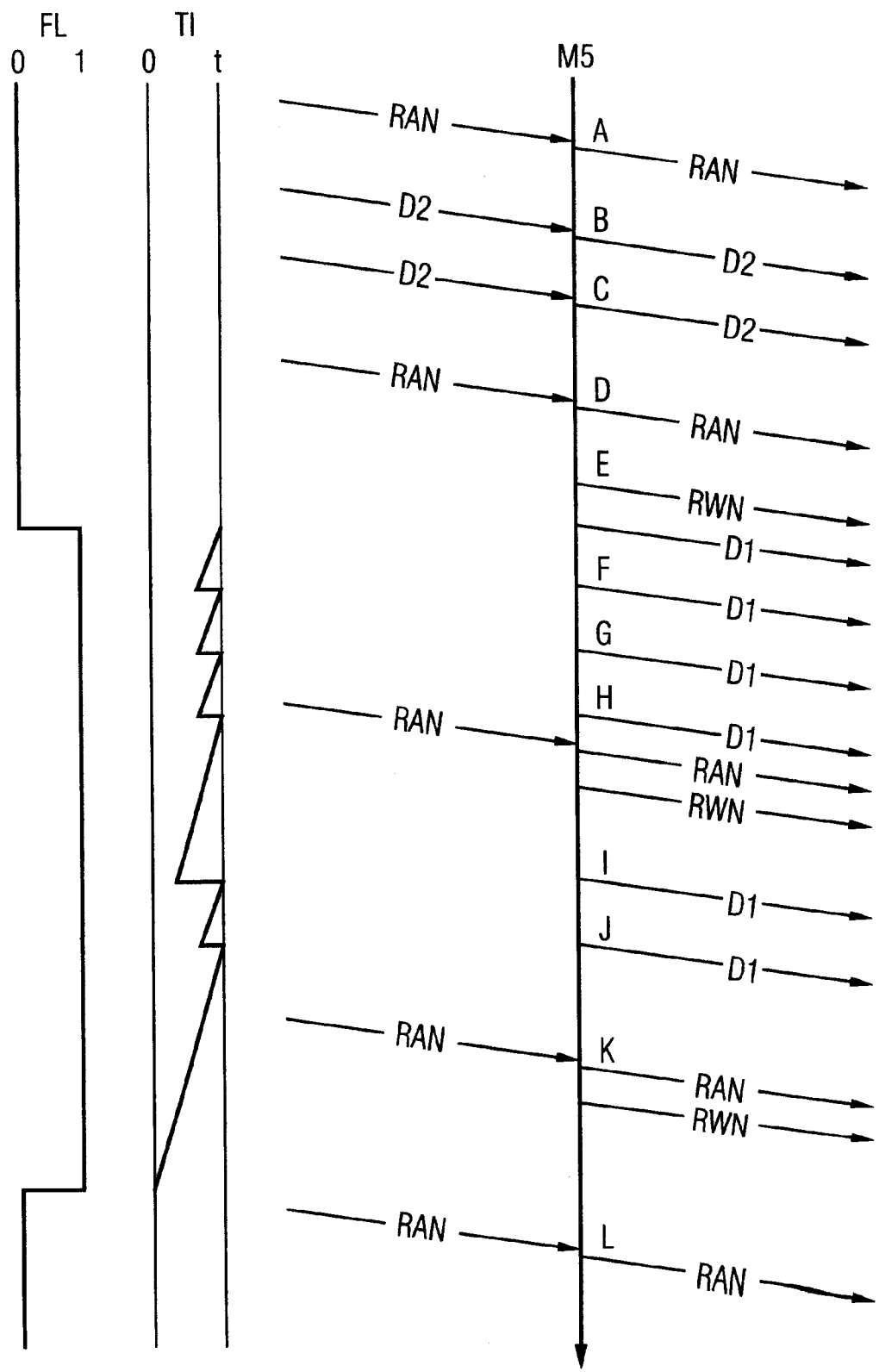
FIG. 4 is a schematic diagram illustrating a further exemplary embodiment of the method which is performed on a network node in the communication network shown in FIG. 1.

Reference is now made to FIG. 4, wherein a further exemplary embodiment of the method in the communication network shown in FIG. 1 is explained in a schematic diagram, the second flag-resetting variant for resetting the RWN reply flag being implemented.

In the diagram of FIG. 4, in a similar manner to FIG. 3, the line "FL" represents the state of the RWN reply flag, and the line M5 represents the fifth network node M5. Also shown is the time characteristic of a decrementing timer TI for resetting the RWN reply flag of the fifth network node M5, which timer counts down from a start time t to the expiration time zero of a presettable time period t. The start value of the timeout is greater than the time interval for the periodic transmitting of RANs by the root network node R, so that RANs do actually arrive at the fifth network node M5 when a RWN reply flag is set. Different situations during the method for setting up bidirectional data transmission paths between the fifth network node M5 and the root network node R are represented by the letters A-L.

The RWN-sent flag of the fifth network node M5 is not shown in FIG. 4. In the second flag-resetting variant for resetting the RWN reply flag, the RWN reply flag can also be used instead of the RWN-sent flag in order to identify whether a data packet D1 is a first data packet (RWN reply flag is cleared) or a further data packet (RWN reply flag is set). The RWN reply flag of the fifth network node M5 is cleared by default. The RWN-sent flag of the fifth network node M5 is cleared by default.

In situation "A", the fifth network node M5 receives a request message RAN from the root network node R, transfers the data transmission path specified therein into its routing table or updates the corresponding entry in its routing table in order thereby to set up a unidirectional data transmission path from the fifth network node M5 to the root network node R, updates the RAN and forwards this modified RAN with a short time delay to the next network nodes. The RWN reply flag of the fifth network node M5 continues to remain cleared. The RWN-sent flag of the fifth network node M5 continues to remain cleared.

In situation "B", the fifth network node M5 receives a data packet D2 from a different network node, the second network node M2 for example, and forwards this data packet D2 to a different network node. The RWN reply flag of the fifth network node M5 continues to remain cleared. The RWN sent flag of the fifth network node M5 continues to remain cleared.

In situation "C", the fifth network node M5 again receives a data packet D2 from a different network node, the second network node M2 for example, and forwards this data packet D2 to a different network node. The RWN reply flag of the fifth network node M5 continues to remain cleared. The RWN-sent flag of the fifth network node M5 continues to remain cleared.

In situation "D", the fifth network node M5 receives a further (recently generated) request message RAN with a sequence number different from the previous RAN from the root network node R, updates the corresponding entry in its routing table in order thereby to set up an updated unidirectional data transmission path from the fifth network node M5 to the root network node R, updates the RAN and forwards this modified RAN, with a short time delay for example, to the next network nodes. The RWN reply flag of the fifth network node M5 continues to remain cleared. The RWN-sent flag of the fifth network node M5 continues to remain cleared.

In situation "E", the fifth network node M5 receives a data packet D1 from a higher layer (S2), that is to say a layer above the wireless mesh layer of the mesh network, within which the network nodes exchange data packets which the fifth network node M5 is to transmit to the root network node R. This is not shown in more detail in FIG. 4.

Before the data packet D1 is transmitted to the root network node R, i.e. even before the transmitting of the first data packet D1, the fifth network node M5 generates and sends a reply message RWN to the root network node R. The root network node R receives the RWN and enters the corresponding data transmission path to the fifth network node M5 in its routing table in order thereby to set up a unidirectional data transmission path (reverse path) from the root network node to the fifth network node M5 and in this way set up a bidirectional data transmission path between the fifth network node M5 and the root network node R. At the same time the fifth network node M5 sets its RWN-sent flag. The fifth network node M5 then sends the data packet D1 to the root network node R, sets its RWN reply flag and sets the timer TI in motion with the start time t.

In situation "F", the fifth network node M5 receives a further data packet D1 (not shown in more detail in FIG. 4) and sends the data packet D1 to the root network node R. The RWN reply flag of the fifth network node M5 continues to remain set. The RWN-sent flag of the fifth network node M5 continues to remain set. The timer TI is reset to the start time t and set in motion once again.

In situation "G", the fifth network node M5 receives a further data packet D1 (not shown in more detail in FIG. 4) and sends the data packet D1 to the root network node R. The RWN reply flag of the fifth network node M5 continues to remain set. The RWN-sent flag of the fifth network node M5 continues to remain set. The timer TI is reset to the start time t and set in motion once again.

In situation "H", the fifth network node M5 receives a further data packet D1 (not shown in more detail in FIG. 4) and sends the data packet D1 to the root network node R. The RWN reply flag of the fifth network node M5 continues to remain set. The RWN-sent flag of the fifth network node M5 continues to remain set. The timer TI is reset to the start time t and set in motion once again.

Next, the fifth network node M5 receives a further (recently generated) routing request message RAN with a sequence number different from the previous RAN from the root network node R, updates the corresponding entry in its routing table in order thereby to set up an updated unidirectional data transmission path from the fifth network node M5 to the root network node R, updates the RAN and forwards this modified RAN with a short time delay to the next network nodes. The fifth network node M5 clears its RWN-sent flag or leaves it set, since its RWN reply flag is set.

As the fifth network node M5 has received a periodically transmitted routing request message RAN from the root network node R and as the RWN reply flag is set, the fifth network node M5 generates a routing reply message RWN and sends the RWN, with a short time delay for example, to the root network node R. The fifth network node M5 sets its RWN-sent flag. The root network node R receives the RWN and overwrites the corresponding data transmission path to the fifth network node M5 in its routing table in order thereby to update its data transmission path (reverse path) from the root network node R to the fifth network node M5. According to the second flag-resetting variant for the RWN reply flag, the RWN reply flag continues to remain set.

In situation "I", the fifth network node M5 receives a further data packet D1 (not shown in more detail in FIG. 4) and sends the data packet D1 to the root network node R. The RWN reply flag of the fifth network node M5 continues to remain set. The RWN-sent flag of the fifth network node M5 continues to remain set. The timer TI is reset to the start time t and set in motion once again.

In situation "J", the fifth network node M5 receives a further data packet D1 (not shown in more detail in FIG. 4) and sends the data packet D1 to the root network node R. The RWN reply flag of the fifth network node M5 remains set. The RWN-sent flag of the fifth network node M5 continues to remain set. The timer TI is reset to the start time t and set in motion once again.

In situation "K", the fifth network node M5 receives a further (recently generated) routing request message RAN with a sequence number different from the previous RAN from the root network node R, updates the corresponding entry in its routing table in order thereby to set up an updated unidirectional data transmission path from the fifth network node M5 to the root network node R, updates the RAN and forwards this modified RAN, with a short time delay for example, to the next network nodes. In addition, the fifth network node M5 clears its RWN-sent flag or leaves it set, since its RWN reply flag is set. As the fifth network node M5 receives a periodically transmitted request message RAN from the root network node R and as the RWN reply flag is set to "1", the fifth network node M5 generates a routing reply message RWN and sends this RWN, with a short time delay for example, to the root network node R. The root network node R receives the RWN and overwrites the corresponding data transmission path to the fifth network node M5 in its routing table in order thereby to update its data transmission path (reverse path) from the root network node R to the fifth network node M5. According to the second flag-resetting variant for the RWN reply flag, the RWN reply flag continues to remain set. The RWN-sent flag is set.

In situation "L", the time period of the timer TI has expired and the RWN reply flag of the fifth network node M5 is cleared. The fifth network node M5 then receives a further (recently generated) routing request message RAN with a sequence number different from the previous RAN from the root network node R, updates the corresponding entry in its routing table in order thereby to set up an updated unidirectional data transmission path from the fifth network node M5 to the root network node R, updates the RAN and forwards this modified RAN, with a short time delay for example, to the next network nodes. Although the fifth network node M5 in fact receives a periodically transmitted routing request message RAN from the root network node R, since the RWN reply flag has been cleared, the fifth network node M5 generates no reply message RWN and sends no corresponding RWN to the root network node R. The RWN-sent flag is cleared.

In the following, the advantages of the method according to various embodiments are presented with the aid of a computational example (example 1) by comparison with a conventional method in which a routing reply message is sent to the root network node only once before the first data packet D1 (comparative example 1), and by comparison with a further possible method in which, following reception of a routing request message (RAN), a routing reply message is always sent to the root network node (comparative example 2).

The following abbreviations are used:
N=Number of network nodes
H=Path length between a network node and the root network node
dH=Average path length from all network nodes to the root network node; dH≥1
t_t=t_total: time period under consideration
t_d=t_data: time in which the network node as source network node sends data to the root network node
RAI=Time duration of the routing request message (RAN) interval
ara=Number of routing request messages (RANs) initiated by the root network node during the time period under consideration ara=((t_t/RAI)+1)

Example 1

For example 1, i.e. proactive RANs with reactive (on-demand) RWN, the number of RANs is yielded as: ara*N.
Number of RWNs: ((t_d/RAI)+1)*H.
Summary number of routing messages:
ara*N+((t_d/RAI)+1)*H.

Comparative example 1

Number of RANs: ara*N.
Number of RWNs: H (before the first data packet D1).
Summary number of routing messages: ara*N+H.

Comparative Example 2

Number of RANs: ara*N.
Number of RWNs: ara*N*dH.
Summary number of routing messages:
ara*N*(1+dH).
Typical values are, for example:
N=30
H=4
dH=3
t_t=900 s
t_d=300 s
RAI=5 s In this process the following costs are produced (summary number of sent routing messages):
(ara=181)
Example 1: 5674 routing messages
Comparative example 1: 5431 routing messages
Comparative example 2: 21720 routing messages As the computational example shows, a substantial reduction in the number of routing messages can be achieved by means of example 1 (method according to various embodiments), in this case 73.9%.

Further features of the invention will emerge from the following description:

The general idea of various embodiments, which improves the non-registration mode, comprises:

that RANs are answered with a RWN from a network node only when said network node sends data packets D1 to the root network node and said network node is the source network node of said data packets D1;

a RWN reply flag, which determines whether an RWN is to be sent in response to an RAN. OFF/0 means that no RWN will be sent, ON/1 means that an RWN will be sent in response to the root network node upon reception of an RAN;

different mechanisms for setting and clearing the aforementioned flags.

The basic rule is that an RWN is sent from a network node to the root network node when the following condition applies: [RWN reply flag=ON/1] AND [[network node has received RAN] OR [path to the root network node has changed]].

The mechanisms of the method according to various embodiments are only implemented by network nodes which are source network nodes of data packets D1 which are sent to the root network node R. In other words, in these network nodes the data packets come from a higher layer and this network node is the first node of this mesh connection. Intermediate nodes which receive data packets D2 and forward these in accordance with their routing table to other network nodes do not need to observe the mechanisms described in the method according to various embodiments for these data packets D2. In particular, on account of such data packets D2 no RWN is sent to the root network node and the RWN reply flag is also not set. By means of the method according to various embodiments it is made possible for forward and reverse paths for transmitting data packets between network node and root network node to run via the same network nodes when data is exchanged between these two network nodes. Forward and reverse paths run via the best path. Failures of data links (link breaks) can be repaired by means of the method according to various embodiments both for the forward path and for the reverse path. Failures of data links on the reverse path from the root network node to the network node no longer need to be repaired using the more complicated and costly AODV route recovery mechanisms.

The RWN reply flag offers a simple decision method for determining whether an RWN is to be sent in response to an RAN. The different methods for resetting the RWN reply flag offer a flexible arrangement, for example the use of a safety interval after the last data packet, in which an RWN is still sent and consequently the reverse path from the root network node to the network node is still maintained. By means of the reply to RANs with an RWN, changes to the data transmission path can also be updated in the intermediate nodes for the reverse direction. By means of the additional improvement, namely that an RWN will also be sent to the root network node when the RWN reply flag is set if the data transmission path from the network node to the root network node changes for a reason other than due to the reception of an RAN, changes in the forward path can be passed on to the reverse path so that the latter will be updated accordingly. The use of the lifetime from the RAN or from the proactive RREQ for the lifetime in the sent RWN results in an equally long availability of the forward and reverse paths.

The invention claimed is:

1. A method for setting up a bidirectional data transmission path in a wireless meshed packet-switched communication network having a plurality of network nodes, one of which serves as a root network node, the method comprising:

setting up a logical topology in the form of at least one routing tree proactively by the root network node of the routing tree sending routing request messages at periodic time intervals to other network nodes of the communication network, the routing request messages specifying first unidirectional data transmission paths to the root network node, setting up a first flag of a particular network node of the plurality of network nodes, the first flag having two selectable states for controlling a sending of a routing reply message by the particular network node, controlling, by the particular network node, setting of the first flag between:

a selectable first state in which the particular network node sends a routing reply message to the root network node in response to the particular network node receiving one of the routing request messages, the routing reply message specifying a second unidirectional data transmission path to the particular network node, as a result of which a bidirectional data transmission path is set up between the root network node and the particular network node, and a selectable second state in which the particular network node sends no routing reply message in response to the particular network node receiving one of the routing request messages, wherein the setting of the first flag is automatically controlled by the particular network node based on predefined rules.

2. The method according to claim 1, wherein:

of the plurality of network nodes, network nodes that receive data packets from one or more higher layers of the OSI model are sources nodes, only source nodes are configured to control the setting of a respective first flag between selectable first and second states, and the particular network node is a source node.

3. The method according to claim 1, wherein the first flag of the particular network node is placed into the second state immediately after the sending of the routing reply message to the root network node.

4. The method according to claim 1, wherein the first flag of the particular network node is placed into the second state following expiration of a selectable first time period which is started with a transmitting of a data packet to the root network node, which data packet the network node has received as a first network node of the communication network on a data transmission path to the root network node, the first time period being reset to a start value of the selectable first time period each time such a data packet is transmitted.

5. The method according to claim 1, wherein the particular network node sends a routing reply message to the root network node when the particular network node, as a first network node of the communication network on a data transmission path to the root network node, has received a data packet for sending to the root network node and, for a first time period immediately preceding the reception of the data packet, has received no data packet for sending to the root network node as the first network node of the communication network on the data transmission path to the root network node.

6. The method according to claim 5, wherein the particular network node sends a routing reply message to the root network node when a second flag which is set up in the particular network node and which has two selectable states for controlling a transmission of a routing reply message has been placed into a selectable first state.

7. The method according to claim 6, wherein the second flag is preset by default to the second state during a primary initialization of the communication network.

8. The method according to claim 1, wherein the first flag of the particular network node is placed into the first state when the particular network node sends a routing reply message to the root network node before a first data packet of a data communication to the root network node.

9. The method according to claim 1, wherein the routing reply message is sent to the root network node immediately following reception of the routing request message.

10. The method according to claim 1, wherein the routing reply message is sent to the root network node with a time delay following reception of the routing request message.

11. The method according to claim 1, wherein the first flag is preset by default to the second state during a primary initialization of the communication network.

12. The method according to claim 1, wherein a lifetime parameter of a routing reply message encoding the lifetime of a second unidirectional data transmission path to the particular network node is set to a lifetime parameter contained in the received routing request message and encoding a lifetime of a first unidirectional data transmission path to the root network node.

13. The method according to claim 1, which is based on a Hybrid Wireless Mesh Protocol (HWMP) hybrid routing protocol.

14. A method for setting up bidirectional data transmission paths in a wireless meshed packet-switched communication network having a plurality of network nodes, one of which serves as a root network node, comprising steps of:
  setting up a logical topology in the form of at least one routing tree proactively by the root network node of the routing tree sending routing request messages at periodic time intervals to other network nodes of the communication network, the routing request messages specifying first unidirectional data transmission paths to the root network node,
  setting up a first flag of a particular network node of the plurality of network nodes, the first flag having two selectable states for controlling a sending of a routing reply message by the particular network node,
  controlling, by the particular network node, setting of the first flag between:
    a selectable first state in which the particular network node sends a routing reply message to the root network node in response to the particular network node detecting a change in a particular first unidirectional data transmission path to the root network node, the routing reply message specifying as second unidirectional data transmission path to the particular network node, as a result of which a bidirectional data transmission path is set up between the root network node and the particular network node, and
    a selectable second state in which the particular network node sends no routing reply message in response to the particular network node receiving one of the routing request messages,
  wherein the setting of the first flag is automatically controlled by the particular network node based predefined rules.

15. A wireless meshed packet-switched communication network in which the network nodes are configured to perform a method as claimed claim 1.

16. A computer software product for a particular network node of a communication network including a plurality of network nodes including the particular network node and another node acting as a root network node, the communication network having a logical topology in the form of at least one routing tree proactively generated by the root network node sending routing request messages at periodic time intervals to others of the plurality of network nodes, the routing request messages specifying first unidirectional data transmission paths to the root network node, the computer software product comprising a non-transitory computer-readable medium in which program instructions are stored, which instructions, when read by a computer of the particular network node, cause the particular network node to:
  control setting of a first flag of the particular network node between the following two selectable states for controlling a sending of a routing reply message:
    a selectable first state in which the particular network node sends a routing reply message to the root network node in response to the particular network node receiving one of the routing request messages, the routing reply message specifying a second unidirectional data transmission path to the particular network node, as a result of which a bidirectional data transmission path is set up between the root network node and the particular network node, and
    a selectable second state in which the particular network node sends no routing reply message in response to the particular network node receiving one of the routing request messages,
  wherein the setting of the first flag is automatically controlled by the particular network node based on predefined rules.

* * * * *